United States Patent [19]
Thiltgen

[11] Patent Number: 4,790,446
[45] Date of Patent: Dec. 13, 1988

[54] FLOATING ROOF DRAIN SYSTEM

[75] Inventor: Roger W. Thiltgen, Buena Park, Calif.

[73] Assignee: Pivot Masters, Inc., Houston, Tex.

[21] Appl. No.: 417,705

[22] Filed: Sep. 13, 1982

[51] Int. Cl.[4] .......................................... B65D 88/42
[52] U.S. Cl. .................... 220/219; 138/131; 138/137; 285/226; 285/242; 285/256
[58] Field of Search ................ 220/219; 285/326, 242, 285/256, 251, DIG. 4; 138/137, 131

[56] References Cited

U.S. PATENT DOCUMENTS

| | | | |
|---|---|---|---|
| 486,986 | 11/1892 | Schinke | 285/261 |
| 1,857,362 | 5/1932 | Day | 220/219 |
| 2,011,781 | 8/1935 | Tabozzi | 138/131 |
| 2,420,053 | 5/1947 | Muller | 285/226 X |
| 2,515,929 | 7/1950 | Ofeldt | 138/137 X |
| 2,707,117 | 4/1955 | Fentress et al. | 285/90 |
| 2,717,095 | 9/1955 | Gable | 220/219 |
| 2,792,848 | 5/1957 | Starbard | 285/256 X |
| 2,888,954 | 6/1959 | Gates | 138/137 |
| 3,066,960 | 12/1962 | Adams | 285/114 |
| 3,073,629 | 1/1963 | Marco | 285/256 |
| 3,154,214 | 10/1964 | Baker | 220/219 |
| 3,170,486 | 2/1965 | De Witt et al. | 137/614 |
| 3,179,447 | 4/1965 | Parr et al. | 285/114 |
| 3,184,917 | 5/1965 | Caouette et al. | 60/35.55 |
| 3,232,640 | 2/1966 | Donkle, Jr. | 285/93 |
| 3,242,499 | 3/1966 | Fonda-Bonardi | 2/2.1 |
| 3,411,157 | 11/1968 | Rabenhorst | 2/2.1 |
| 3,427,052 | 2/1969 | Gonser | 285/256 |
| 3,663,044 | 5/1972 | Contreras et al. | 285/226 |
| 3,681,862 | 8/1972 | De Koning et al. | 37/58 |
| 3,700,267 | 10/1972 | Piegza | 285/24 |
| 3,875,806 | 4/1975 | Brewster | 74/18.2 |
| 4,158,462 | 6/1979 | Coral | 285/226 X |
| 4,308,968 | 1/1982 | Thiltgen et al. | 220/222 |

FOREIGN PATENT DOCUMENTS

| | | | |
|---|---|---|---|
| 747473 | 6/1933 | France | 285/242 |
| 27325 | of 1897 | United Kingdom | 285/242 |
| 16547 | of 1907 | United Kingdom | 285/242 |
| 1383313 | 2/1975 | United Kingdom | 138/131 |

OTHER PUBLICATIONS

Ray E. Decker, "Careful Design Remains Key to Good Floating-Roof Drains", Jun. 1, 1981 issue of *Oil and Gas Journal*, pp. 107–110.

*Primary Examiner*—Stephen Marcus
*Assistant Examiner*—Gary E. Elkins
*Attorney, Agent, or Firm*—Bogucki, Scherlacher, Mok & Roth

[57] ABSTRACT

A drain system for the floating roof of an oil tank or similar tank couples a drain sump at the underside of a central portion of the floating roof to the outside of the tank wall at a lower portion thereof via a flexible arrangement of rigid pipe lengths joined together by swivel joints. Each swivel joint is made pivotable about an single axis by a pair of side frames having pairs of leg portions pivotally coupled to each other along the axis and mounting a length of flexible pipe therebetween. The opposite ends of the length of flexible pipe are coupled to an opposite pair of pipe couplings mounted on central portions of the side frames between the leg portions and adapted to be coupled to the lengths of rigid pipe. The length of flexible pipe which is comprised of a length of flexible hose disposed between inner and outer wire helices is coupled to the pipe couplings by arrangements which include swedges, swedge rings and collars.

1 Claim, 5 Drawing Sheets

FLOATING ROOF DRAIN SYSTEM

BACKGROUND OF THE INVENTION

1. Field of the Invention

The present invention relates to drain systems for use with floating roofs in storage tanks, and more particularly to oil tank floating roof drain systems utilizing rigid pipes and swivel joints.

2. History of the Prior Art

It is well known to store volatile liquids such as oil and other petroleum products in large tanks of generally cylindrical configuration and having a floating roof. The floating roof which is of generally circular configuration and which is of slightly smaller diameter than the inside of the tank floats on the oil or other liquid in the tank so as to move up and down within the tank as the level of the liquid within the tank varies. The floating roof which protects the oil from external contaminates is normally provided with one or more seals which seal the small area between the outer edge of the floating roof and the inner tank wall while at the same time permitting the roof to move up and down within the tank. The seals greatly minimize or eliminate the escape of fumes or vapors from inside the tank so as to protect the environment, while at the same time preventing rain water, dirt and other external elements from entering the oil stored in the tank. Examples of such seals are provided by U.S. Pat. No. 4,308,968, SECONDARY SEAL FOR TANK HAVING FLOATING ROOF, Roger W. Thiltgen et al, which patent issued Jan. 5, 1982 and is commonly assigned with the present application.

Most such floating roofs are configured so as to drain toward a low point at the center thereof. This tends to direct rain water away from the outer edge of the floating roof where it might eventually damage the seal and flow into the oil within the tank. The low point at the center of the roof has a drain leading to a collecting sump at the underside of the roof so that rain water which collects on the roof can be safely routed into the sump and through a drain system to the outside of the tank. The drain system which basically resides within the tank and is submerged within the oil may comprise any one of a number of different basic arrangements. Traditionally, floating roof drain systems were comprised of lengths of relatively rigid pipe joined together by swivel joints to provide a flexible arrangement which extended from the sump to a lower portion of the tank wall. At the lower portion of the tank wall, one of the lengths of rigid pipe exited the tank so as to drain the rain water collecting at the center of the roof to a location outside of the tank where it could be disposed of safely and properly. Another type of drain system which has come into widespread use in recent years utilizes a length of flexible pipe or conduit coupled between the collecting sump and the tank wall, and disposed within the oil or other liquid in the tank.

The drain systems for use with floating roofs must be capable of flexing through a substantial range of movement so as to accommodate vertical movements of the floating roof between an uppermost position at the top of the tank and a lowermost position in which the roof resides at a relatively small distance above the bottom of the tank. In addition, such drain systems must be capable of relatively leak-free operation in the face of a substantial pressure differential. The pressure of the oil or other liquid within the tank is usually substantially greater than the pressure within the drain system itself. The natural tendency is for the higher pressure oil to leak into and then escape through the drain system. Because of the relatively large size and resulting bulkiness of typical drain systems, they tend to encounter substantial stresses on various parts thereof, which stresses can damage or destroy the parts and render the drain system ineffective or useless. Because gravity is relied upon to drain the rain water from the floating roof through the drain system, the drain system must be such as to provide a positive gravity feed at all times and in the face of the varying levels of the floating roof.

In the case of drain systems of the rigid conduit, swivel joint type, the swivel joints are designed to rotate or pivot about a given axis. Typically, two lengths of curved pipe are made rotatable relative to each other by a bearing which is sealed. Despite the sealing of the bearings, the seals tend to fail or leak rather readily. This is due largely to the fact that practically all of the stress placed on the swivel joint occurs at the seal bearing where the relative motion takes place. It is also due to the fact that such swivel joints are normally designed for use in other environments in which the pressure within the joint is far greater than on the outside of the joint. Most such joints are not designed to withstand a greater external fluid pressure. Seal or bearing damage or failure may result in leakage of the oil from inside the tank into the drain system. It can also result in leakage of rain water and other contaminates into the oil within the tank. Repair or replacement of damaged swivel joints is time consuming and expensive and frequently requires that the tank be completely drained so that the drain system can be worked on from within the tank.

It was in the face of such problems that the flexible conduit type of drain system was developed. Such systems typically utilize a single length of flexible pipe or conduit which extends between the collecting sump at the underside of the center of the floating roof and a lower portion of the tank wall. The flexible conduit flexes or bends as necessary to accommodate the upward and downward movements of the floating roof while at the same time providing a drain path for rain water or other material collected on the roof. The flexible conduit is normally made flexible along the entire length thereof so that no single portion thereof is subjected to substantially greater stress than other portions thereof. The need for sealed bearings within joints is thereby eliminated.

However, flexible conduit drain systems are not without problems of their own. For one thing, it is relatively expensive to design and build a flexible conduit which can maintain an effective seal between the inside and the outside thereof in the face of the substantially greater external pressure differential and the highly aromatic nature of oil, gasoline and other petroleum products. Another problem resides in the tendency of the flexible conduit to float. As a result the flexible conduit frequently forms loops or at least high points therein. This interferes with the positive gravitation operation of the drain system, and may require that weights or ballast be added to portions of the flexible conduit to counteract the tendency for the conduit to float.

The relative merits of the rigid conduit, swivel joint type of drain system and the flexible conduit type of drain system are discussed in an article by Ray E. Decker entitled "Careful Design Remains Key To Good Floating-Roof Drains" at pp. 107–110 of the June 1, 1981 issue of OIL AND GAS JOURNAL. The article discusses both types of drain systems before concluding that the flexible conduit type of system holds the most promise because of the problems inherent in the use of the swivel joints in the rigid conduit, swivel joint types of systems.

The Decker article points to the fact that most of the problems in the rigid conduit, swivel joint type systems reside in the swivel joints presently being used. The article also recognizes the problems inherent in the flexible conduit type systems, but feels that these problems can be more easily overcome than the basic problems characterizing the types of swivel joints currently used. The article thus points up the desirability of providing an improved swivel joint for use with drain systems of the rigid conduit, swivel joint type. The rigid conduit, swivel joint type of drain system which was among the first to be developed avoids some of the limitations inherent in flexible conduit and other types of systems and appears to be the clear choice for many applications if the problems present in the swivel joints can be minimized or eliminated.

BRIEF DESCRIPTION OF THE INVENTION

The present invention provides a floating roof drain system of the rigid conduit, swivel joint type in which a greatly improved swivel joint is used. Swivel joints in accordance with the invention utilize a frame which pivots along a single axis and which mounts a pair of pipe fittings at opposite portions thereof. The pipe fittings are adapted for easy connection to the ends of lengths of rigid pipe used in the drain system. The ends of a pair of rigid pipe lengths joined together by the swivel joint are coupled together by a length of flexible pipe or hose disposed within the frame and coupled at the opposite ends thereof to the opposite pair of pipe fittings. The length of flexible pipe readily flexes to permit the frame to pivot through a relatively wide range of angles while maintaining continuous connection between the joined lengths of rigid pipe. The need for joints requiring sealed bearings is eliminated. The pivoting frame is constructed so as to withstand substantially all of the stress placed upon the joint, allowing the flexible pipe to flex as necessary and free of substantial forces thereon. Because the entire drain system requires only a relatively small amount of flexible piping, such pipes can be of very high quality so as to be virtually leak proof in the face of the substantially greater external pressure placed thereon and the highly aromatic nature of the liquids surrounding the flexible pipes.

In a preferred embodiment of a drain system in accordance with the invention, each of the swivel joints is comprised of a pair of identical side frames. Each side frame has a central portion joining a pair of opposite leg portions. Each of the leg portions of one side frame is pivotally coupled to a different one of the leg portions of the other side frame so that the entire frame comprised of the two different side frames is pivotable about a single central axis therethrough. A different one of a pair of pipe couplings is mounted on the outside of the central portion of each side frame and is generally ring-shaped so as to readily receive a standard pipe coupling flange at the end of a length of rigid pipe. Each of the opposite ends of the length of flexible pipe which resides within the frame is coupled to a different one of the pipe couplings by an arrangement which includes a swedge, a swedge ring and a collar. The swedge which is of hollow, generally circular configuration has a portion thereof of larger diameter which resides within and is attached such as by welding to the walls of the generally circular aperture within the associated ring-shaped pipe coupling. The swedge tapers from a portion of larger diameter to a second portion of reduced diameter which receives an end of the length of flexible pipe on the outside thereof through swedging action. The coupling is completed by a swedge ring which resides on the outside of the swedge at the tapered portion thereof and a collar of hollow, generally cylindrical configuration which is disposed on the outside of the end of the length of flexible pipe opposite the portion of reduced diameter of the swedge. The length of flexible pipe is comprised of inner and outer wire helices with a length of flexible hose disposed therebetween.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
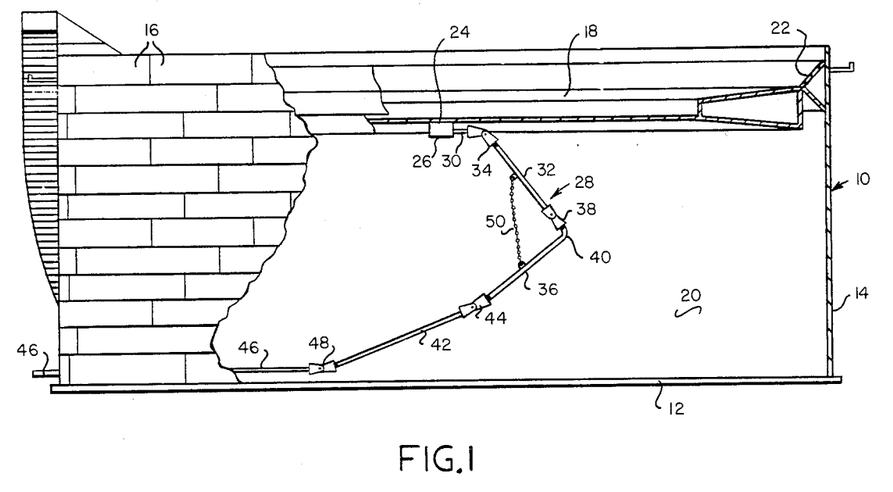
FIG. 1 is a side view of a storage tank with floating roof, the tank being partly broken away to reveal a drain system in accordance with the invention.
Figure 2:
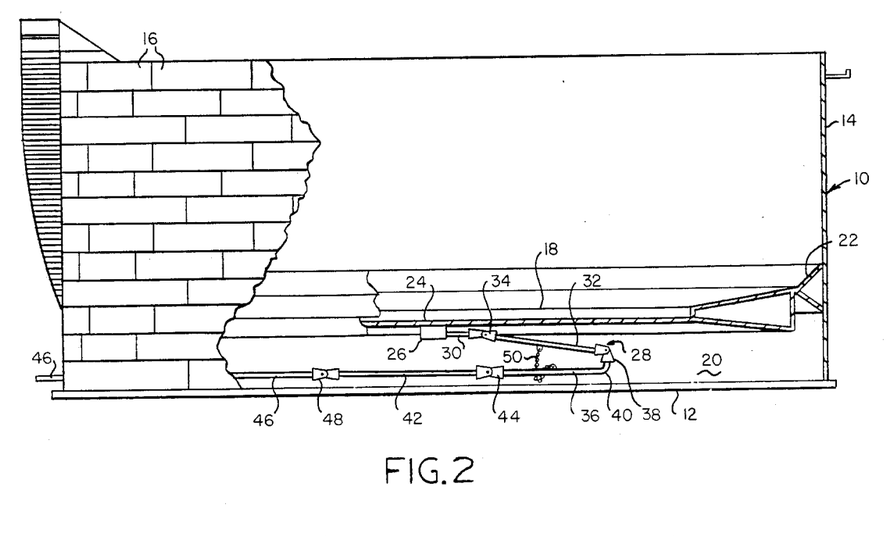
FIG. 2 is a view similar to FIG. 1 but with the floating roof in a lowered position.

FIGS. 1 and 2 depict a storage tank 10 of generally cylindrical configuration. The storage tank 10 has a relatively flat bottom 12 and a generally cylindrical side wall 14. The side wall 14 is comprised of a series of steel plates 16 which are welded or riveted together in the fashion typically employed in the construction of storage tanks for oil or other petroleum products.

The storage tank 10 includes a floating roof 18 of generally circular configuration and having an outer diameter slightly smaller than the inner diameter of the side wall 14. The roof 18 floats on the surface of a quantity of liquid 20 such as oil stored within the tank 10. A sealing arrangement 22 extends between the outer edge of the roof 18 and the inner surface of the side wall 14 of the tank 10 to seal the space therebetween while at the same time permitting upward and downward movement of the roof 18 within the tank 10. In the view of FIG. 1 the tank 10 contains a relatively large amount of the liquid 20 so that the roof 18 is disposed adjacent the top of the tank 10. In the view of FIG. 2 most of the liquid 20 has been removed from the tank 10 such that the floating roof 18 resides at a lowermost position within the tank 10.

The floating roof 18 is configured so as to direct rain water which falls thereon away from the sealing arrangement 22 and toward a drain 24 at the center of the roof 18. The drain 24 empties into a collecting sump 26 disposed at the underside of the central portion of the roof 18. The collecting sump 26 is coupled to the outside of the tank 10 by a drain system 28. The drain system 28 includes a first length 30 of relatively rigid pipe extending outwardly in a generally horizontal direction from the side of the sump 26 and coupled to a second length 32 of relatively rigid pipe by a first swivel joint 34. The second length 32 of rigid pipe is coupled to a third length 36 of relatively rigid pipe by a second swivel joint 38. The third length 36 of rigid pipe has a substantially right angle bend 40 therein immediately below the second swivel joint 38. The third length 36 of rigid pipe is coupled to a fourth length 42 of relatively rigid pipe by a third swivel joint 44. The fourth length 42 of rigid pipe is coupled to a fifth length 46 of relatively rigid pipe by a fourth swivel joint 48. The fifth length 46 of rigid pipe extends through a lower portion of the side wall 14 of the tank 10 so as to extend the drain system 28 to the exterior of the storage tank 10.

Rain water which collects on the roof 18 flows through the drain 24 and into the collecting sump 26. From the collecting sump 26, the rain water flows through the first pipe length 30, the first swivel joint 34, the second pipe length 32, the second swivel joint 38, the third pipe length 36, the third swivel joint 44, the fourth pipe length 42, the fourth swivel joint 48 and the fifth pipe length 46 to the exterior of the tank 10. It will be appreciated that the drain system 28 must be flexible so as to allow for the different vertical positions of the roof 18. At the same time, the size and the nature of the drain system 28 require that each of the joints 34, 38, 44 and 48 flex or pivot along a single axis so that the drain system 28 remains generally within a single plane as it flexes to accommodate relocations of the roof 18. In spite of this, substantial stresses are placed on various portions of the drain system 28 because of the sheer size and mass thereof and the relative difficulty of moving the drain system 28 within a large body of the liquid 20. It will also be appreciated that a relatively dense liquid such as oil exerts substantial pressure on the exterior of the drain system 28 so as to create a substantial pressure differential between the outside and the inside of the drain system 28. It is also important that the drain system 28 avoid any loops or rises therein which would interfere with a positive gravity feed from the collecting sump 26 down to the fifth pipe length 46. This is aided in part by a length of chain 50 which has a first end thereof coupled to the second pipe length 32 and an opposite second end thereof coupled to the third pipe length 36.

It will be observed in FIG. 1 that when the floating roof 18 is in its uppermost position, the drain system 28 provides a positive gravity flow from the collecting sump 26 to the fifth pipe length 46. The second and third pipe lengths 32 and 36 are relatively steeply inclined. The fourth pipe length 42, while being somewhat less inclined, is still inclined by a sufficient amount to encourage the gravity flow of rain water into the fifth pipe length 46 and out of the tank 10. The length of chain 50 raises the third pipe length 36 relative to the second pipe length 32 so that the fourth pipe length 42 maintains an advantageous drainage angle relative to the fifth pipe length 46.

As the floating roof 18 is lowered from the uppermost position shown in FIG. 1, the second pipe length 32 pivots upwardly relative to the first pipe length 30 via the swivel joint 34. At the same time the third pipe length 36 forms an increasingly more severe angle with the second pipe length 32 at the swivel joint 38. At the same time the third pipe length 36 and the fourth pipe length 42 move toward horizontal positions. When the floating roof 18 has moved all the way to its lowermost position which is depicted in FIG. 2, the second pipe length 32 has assumed a position which is slightly inclined from the horizontal. At the same time, the third and fourth pipe lengths 36 and 42 assume generally horizontal positions together with the fifth pipe length 46. Because the various pipe lengths 30, 32, 36, 42 and 46 are either horizontal or downwardly sloping, a positive gravity feed continues to be maintained between the collecting sump 26 and the fifth pipe length 46 so that rain water collecting on the roof 18 readily drains to the outside of the tank 10.

Figure 3:
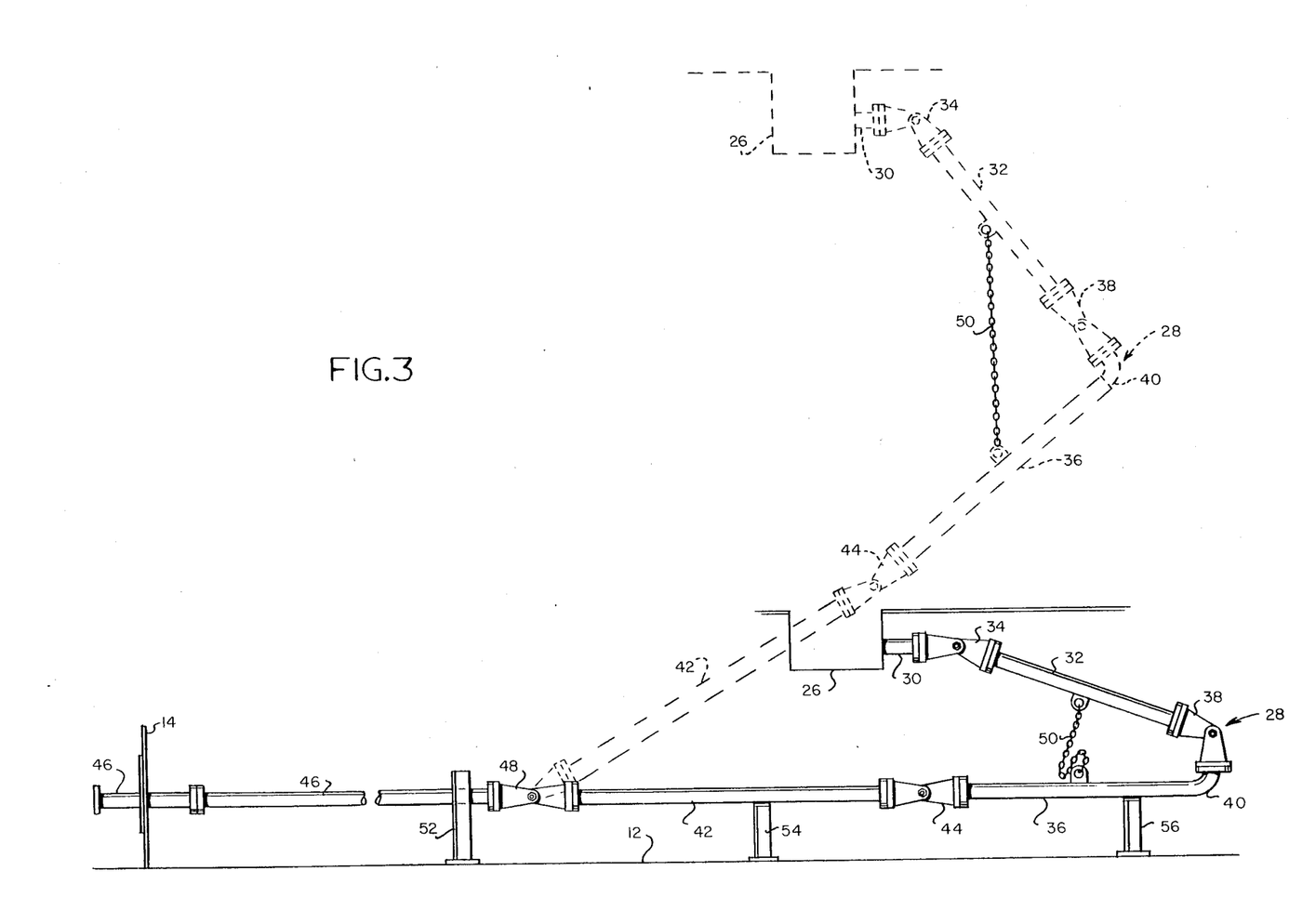
FIG. 3 is a side view of the drain system of FIGS. 1 and 2, showing such drain system in greater detail.
Figure 4:
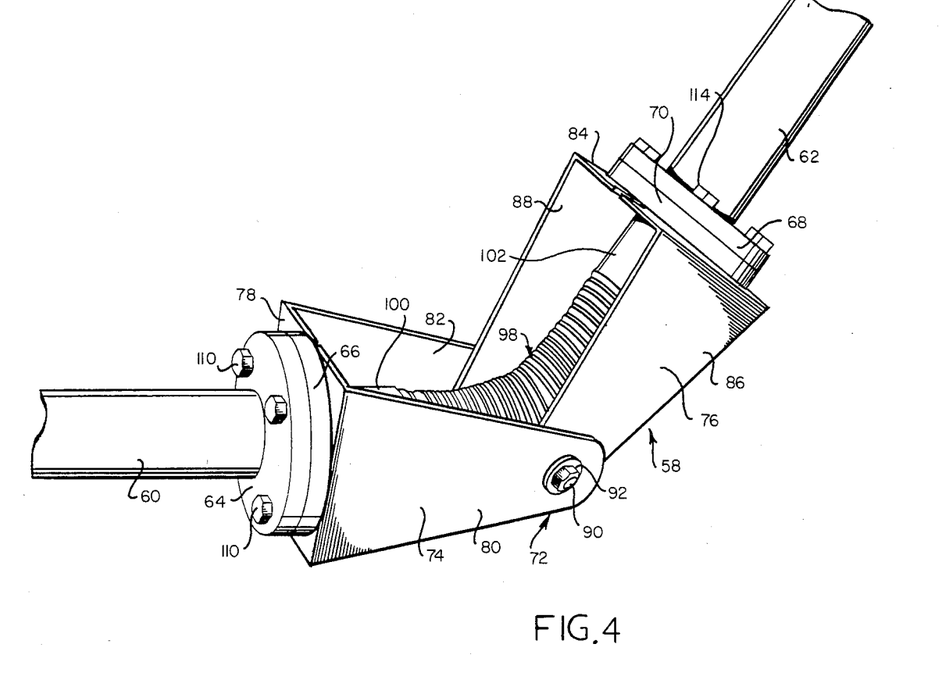
FIG. 4 is a perspective view of a swivel joint used in the drain system of FIG. 1.
Figure 5:
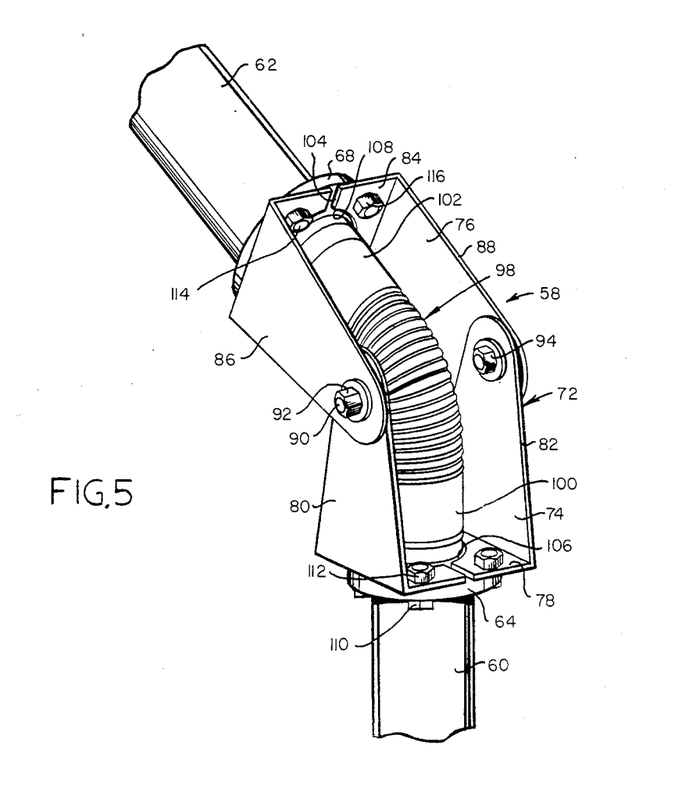
FIG. 5 is a different perspective view of the swivel joint of FIG. 4.
Figure 6:
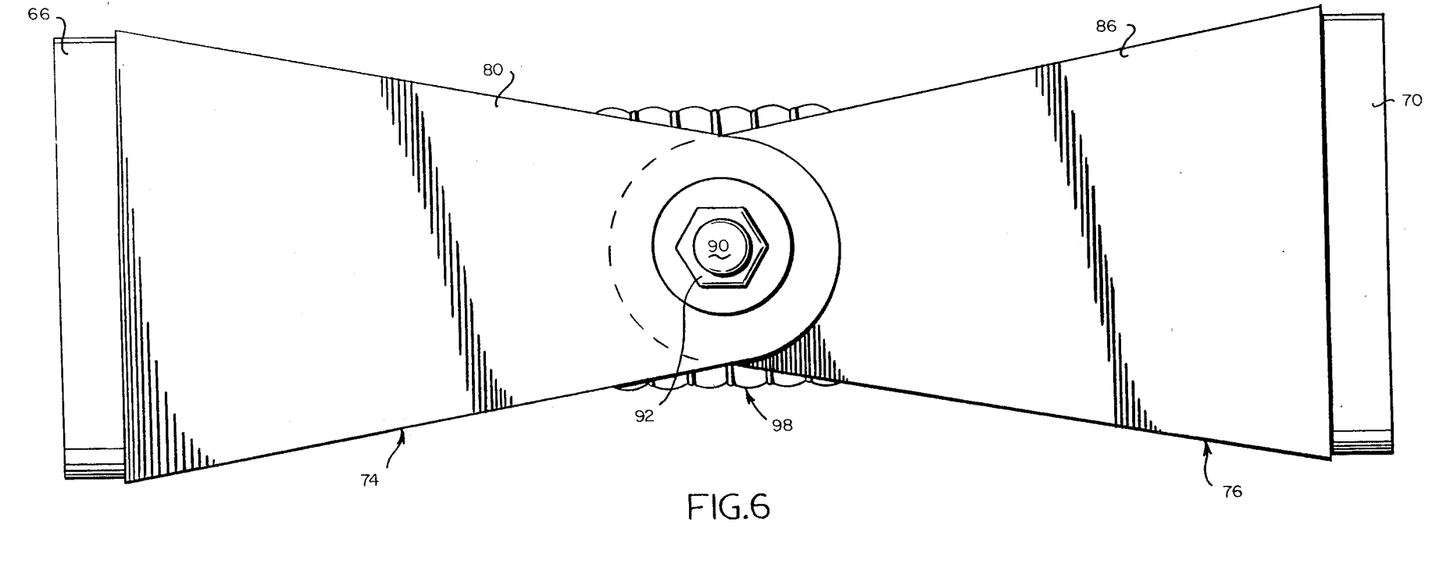
FIG. 6 is a side view of the swivel joint of FIG. 4.

FIG. 3 depicts the drain system 28 of FIGS. 1 and 2 in greater detail. The drain system 28 is shown in solid outline in the position it assumes when the roof 18 is in the lowermost position of FIG. 2. The drain system 28 is shown in dotted outline in the position it assumes when the roof 18 is in the uppermost position shown in FIG. 1. The fifth pipe length 46 is supported adjacent the end thereof opposite the side wall 14 of the tank 10 by a support 52 mounted on the bottom 12 of the tank 10. A support 54 which is also mounted on the bottom 12 supports the fourth pipe length 42 when the roof 18 reaches its lowermost position shown in FIG. 2 and the fourth pipe length 42 is lowered to a generally horizontal position. Likewise, a support 56 mounted on the bottom 12 supports the third pipe length 36 when the roof 18 is in the lowermost position.

It will be seen from FIG. 3 as well as FIGS. 1 and 2 that the various swivel joints must be capable of undergoing a substantial range of angular movement while at the same time withstanding a substantial pressure differential and considerable forces thereon. In the particular arrangement of FIGS. 1-3, the second swivel joint 38 moves to an angle of almost 90° as the roof 18 moves between the uppermost and lowermost positions of FIGS. 1 and 2. The considerable size of the drain system 28 together with the substantial weight and mass of the various pipe lengths places considerable stress on the various swivel joints as the drain system 28 is lowered and raised. As previously noted the swivel joints must flex in such a way as to maintain the drain system 28 substantially within the same plane as the system 28 flexes in response to movement of the roof 18. The construction of the swivel joints 34, 38, 44 and 48 confines them to pivoting movement about a single pivot axis as described hereafter. Moreover, the design of such joints is such that they are capable of withstanding substantial stress and the substantial pressure differentials which typically exist in such environments.

FIGS. 4-8 show a preferred embodiment of a swivel joint 58 which can be used as the various swivel joints 34, 38, 44 and 48 in the arrangement of FIGS. 1-3. The swivel joint 58 is shown coupled to a length 60 of relatively rigid pipe and a length 62 of relatively rigid pipe. In the case where the swivel joint 58 comprises the swivel joint 44 of FIGS. 1-3, the pipe lengths 60 and 62 would comprise the fourth pipe length 42 and the third pipe length 36 respectively. The pipe length 60 terminates in a generally disk-shaped flange 64 which is coupled to the swivel joint 58 by a pipe coupling 66. The pipe length 62 terminates in a disk-shaped flange 68 which is coupled to a pipe coupling 70.

The pipe couplings 66 and 70 are mounted on opposite portions of a pivotable frame 72 within the swivel joint 58. The pivotable frame 72 includes opposite side frames 74 and 76 of substantially identical construction. The side frame 74 has a central portion 78 thereof extending between an opposite pair of leg portions 80 and 82 and mounting the pipe coupling 66 thereon. The leg portions 80 and 82 are spaced apart from and generally parallel with each other and form generally right angles with the central portion 78. The side frame 76 is comprised of a central portion 84 extending between opposite leg portions 86 and 88 and mounting the pipe coupling 70. The leg portion 86 is pivotally coupled to the leg portion 80 by a bolt 90 which extends through both leg portions and has a nut 92 secured on the outside thereof. The leg portion 88 is pivotally coupled to the leg portion 82 by a bolt 94 which extends through both leg portions and has a nut 96 mounted on the outside thereof. The bolts 90 and 94 lie along the same axis which defines the pivot axis for the pivotable frame 72 and thus for the swivel joint 58.

A length 98 of flexible pipe which resides within the pivotable frame 72 has a first end 100 thereof coupled to the pipe coupling 66 and a second end 102 thereof coupled to the pipe coupling 70. The flexible pipe length 98 is capable of flexing as the pivotable frame 72 pivots about the bolts 90 and 94 so as to maintain the coupling between the pipe lengths 60 and 62.

Figure 8:
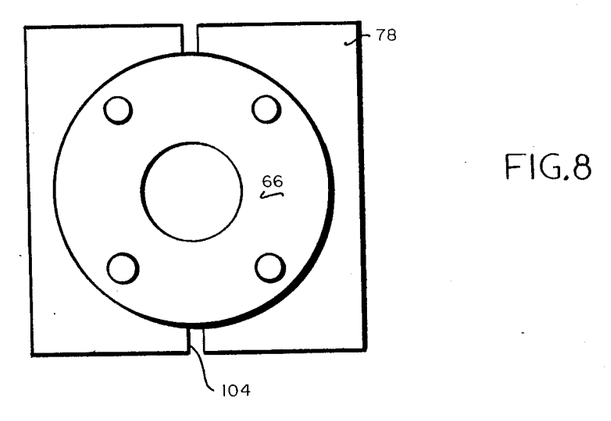
FIG. 8 is an end view of the swivel joint of FIG. 4.

As seen in FIG. 8 as well as in some of the other figures, each of the central portions 78 and 84 of the side frames 74 and 76 is comprised of two different pieces of metal having a small separation 104 therebetween. The central portions 78 and 84 also have a circular aperture 106 and 108 therein for respectively receiving the first and second ends 100 and 102 of the flexible pipe length 98. The pipe couplings 66 and 70 are attached to the outer surfaces of the central portions 78 and 84 respectively by welding or other appropriate means. The disk-shaped flange 64 attached to the end of the pipe length 60 is readily attached to the pipe coupling 66 by a plurality of bolts 110 which extend through apertures in the flange 64, the pipe coupling 66 and the central portion 78. Each of a plurality of nuts 112 is secured to a different one of the bolts 110 adjacent the central portion 78. In like fashion the flange 68 attached to the end of the pipe length 62 is secured to the pipe coupling 70 by a plurality of bolts 114 which extend through apertures in the flange 68, the pipe coupling 70 and the central portion 84 and which receive a plurality of nuts 116.

Figure 7:
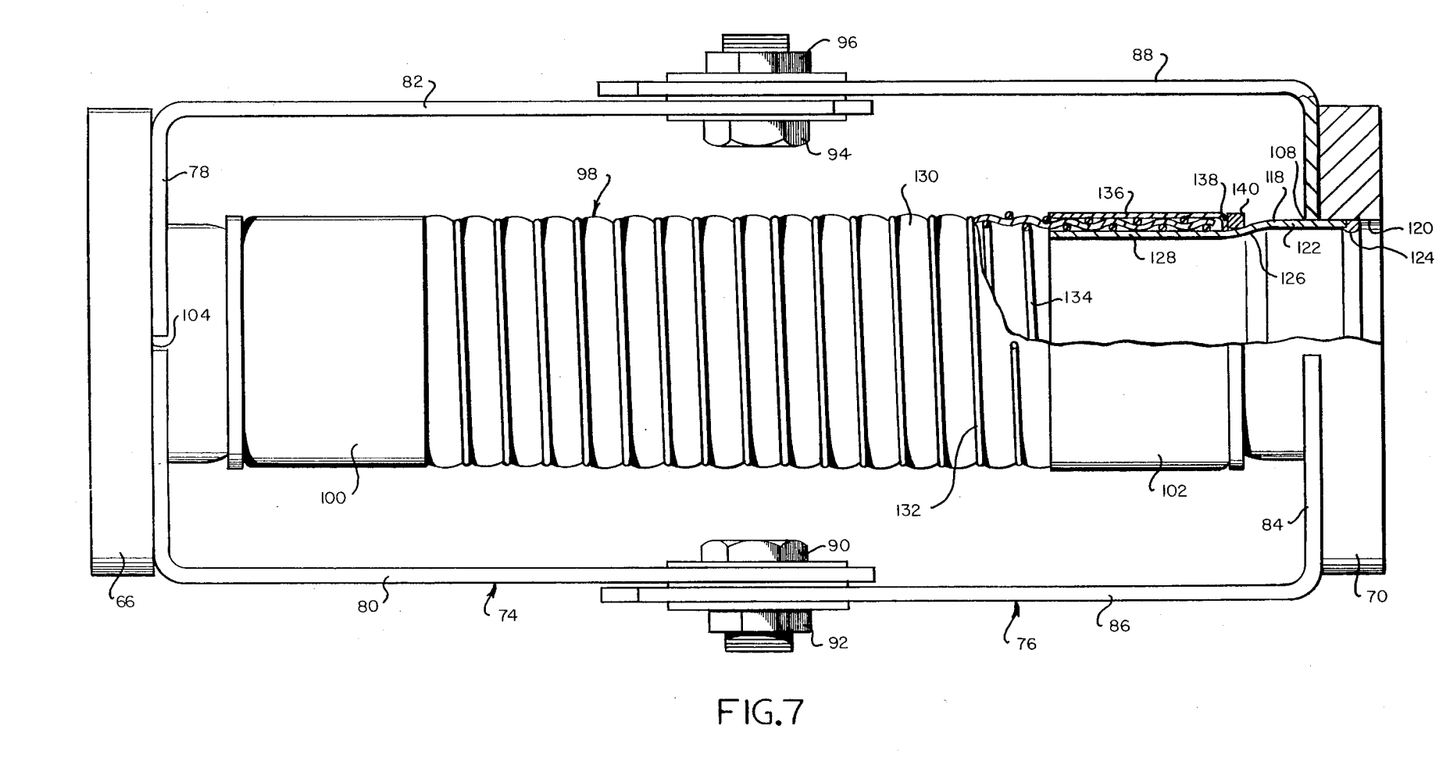
FIG. 7 is a top view of the swivel joint of FIG. 4 with a portion thereof being shown broken away and in section.

Each of the opposite ends 100 and 102 of the length of flexible pipe 98 is attached to its respective pipe couplings 66 and 70 by a swedged arrangement which is shown in detail in FIG. 7. As seen in FIG. 7 a hollow, circular swedge 118 extends into the interior of the side frame 76 from the central portion 84 and the pipe coupling 70. The pipe coupling 70 is generally ring-shaped and has a circular aperture 120 therein. The swedge 118 has a first generally cylindrical portion 122 of larger diameter which extends through the circular aperture 108 in the central portion 84 and seats within the circular aperture 120 in the pipe coupling 70. The first portion 122 of the swedge 118 is secured within the circular aperture 120 such as by welding, a welding bead 124 being shown in FIG. 7. As the swedge 118 extends into the interior of the side frame 76 from the pipe coupling 70, it narrows through a tapered portion 126 to a second generally cylindrical portion 128 of reduced diameter smaller than the diameter of the first portion 122. The length of flexible pipe 98 is comprised of a length of flexible hose 130 which, in the present example, is made of alternating layers of polypropylene fabric ad film so as to be impervious to highly aromatic liquids such as gasoline. The hose 130 is held in a generally cylindrical configuration while at the same time being maintained highly flexible by an outer wire helix 132 and an inner wire helix 134. The inner wire helix 134 is disposed within the outer wire helix 132 with the flexible hose 130 being disposed therebetween. The various coils of the wire helices 132 and 134 are disposed in alternating relation. The inner diameter of the outer wire helix 132 is slightly smaller than the outer diameter of the inner wire helix 134. As a consequence, the flexible hose 130 undulates over the inner wire helix 134 and under the outer wire helix 132 as illustrated in FIG. 7.

The length of flexible pipe 98 extends onto the outside of the second portion 128 of the swedge 118 where it is surrounded by a hollow, generally cylindrical collar 136. The collar 136 which is generally coextensive with the second portion 128 of the swedge 118 curves inwardly at one end thereof so as to form a lip 138 which extends onto the outer surface of the second portion 128 of the swedge 118. The lip 138 abuts a swedge ring 140 of generally rectangular cross sectional shape which is disposed on the outside of the swedge 118 at the tapered portion 126. A tight, virtually leak proof fit is provided by swedging the end of the length of flexible pipe 98 over the outside of the second portion 128 of the swedge 118 together with the collar 136 and the swedge ring 140. While not shown in FIG. 7, the outer surface of the second portion 128 of the swedge 118 is provided with a very fine spiral thread. The end of the length of flexible pipe 98 is rotated relative to the swedge 118 in the direction of the thread during the swedging operation.

The first end 100 of the length of flexible pipe 98 is identical in construction to the second end 102 and is joined to the pipe coupling 66 in the same manner.

It will be appreciated that the swivel joint 58 shown in FIGS. 4–8 is capable of readily flexing while at the same time providing a strong and relatively leak proof joint. The side frames 74 and 76 which are preferably of stainless steel construction combine with the steel pipe couplings 66 and 70 to provide a relatively strong and rigid framework capable of withstanding substantial stresses imposed on the drain system 28. It has been found that if the stresses become great enough the lengths of pipe 60 and 62 will buckle before the swivel joint 58 itself undergoes significant deformation or destruction. The flexible pipe 98 which is readily flexible in response to hinging movement of the pivotable frame 72 is reinforced by the wire helices 132 and 134 so as to remain substantially completely impervious to highly aromatic liquids in the face of substantial pressure differentials. The arrangements in which.the opposite ends of the flexible pipe 98 are swedged onto the swedges 118 using the collar 136 and the swedge ring 140 provide relatively tight, leak proof couplings to the opposite pipe couplings 66 and 70.

While the invention has been particularly shown and described with reference to a preferred embodiment thereof, it will be understood by those skilled in the art that various changes in form and details may be made therein without departing from the spirit and scope of the invention.

What is claimed is:

1. A swivel joint comprising the combination of a pair of side frames, each having a central portion and an opposite pair of leg portions, each of the leg portions being pivotally coupled to a different one of the leg portions of the other side frame, a pair of pipe couplings, each being mounted on the central portion of a different one of the pair of the side frames and having a generally circular aperture therein, a length of flexible pipe disposed within the pair of side frames and having a first end coupled to a first one of the pair of pipe couplings and an opposite second end coupled to a second one of the pair of pipe couplings, the length of flexible pipe being comprised of an outer wire helix, and an inner wire helix disposed within the outer wire helix and a hollow, generally cylindrical length of flexible hose disposed between the outer wire helix and the inner wire helix, a pair of hollow, generally circular swedges, each being mounted within the generally circular aperture of a different one of the pair of pipe couplings and mounting a different one of the first and second ends of the length of flexible pipe thereon, a pair of hollow, generally cylindrical collars, each being disposed over a portion of the outside of a different one of the pair of swedges and receiving a different one of the first and second ends of the length of flexible pipe therebetween, each of the swedges having a first generally cylindrical portion of larger diameter welded to a different one of the pipe couplings within the generally circular aperture thereof and tapering to a second generally cylindrical portion of smaller diameter disposed inside of a different one of the first and second ends of the length of flexible pipe, and a pair of rings, each disposed on the outside of a different one of the pair of swedges where the swedge tapers from the first generally cylindrical portion of larger diameter to the second generally cylindrical portion of smaller diameter and residing against an end of a different one of a pair of generally cylindrical collars.

* * * * *